(12) United States Patent
Uchino (10) Patent No.: US 6,352,415 B1
(45) Date of Patent: Mar. 5, 2002

(54) VARIABLE CAPACITY HYDRAULIC PUMP

(75) Inventor: Kazuyoshi Uchino, Saitama (JP)

(73) Assignee: Bosch Braking Systems Co., Ltd., Tokyo (JP)

(*) Notice: Subject to any disclaimer, the term of this patent is extended or adjusted under 35 U.S.C. 154(b) by 10 days.

(21) Appl. No.: 09/635,121

(22) Filed: Aug. 9, 2000

(30) Foreign Application Priority Data

Aug. 27, 1999 (JP) ............................................. 11-241083

(51) Int. Cl.$^7$ ................................................. F04B 49/00
(52) U.S. Cl. ....................................... 417/220; 417/303
(58) Field of Search ................................. 417/220, 310, 417/303, 304, 307, 308, 218, 221

(56) References Cited

U.S. PATENT DOCUMENTS 5,895,209 A * 4/1999 Miyazawa ................... 418/26
6,120,256 A * 9/2000 Miyazawa ................... 417/220
6,217,296 B1 * 4/2001 Miyazawa et al. .......... 417/310

* cited by examiner

Primary Examiner—Teresa Walberg
Assistant Examiner—Thor Campbell
(74) Attorney, Agent, or Firm—Sughrue Mion, PLLC

(57) ABSTRACT

First and second fluid pressure chambers 43 and 44 are formed on both sides of a swingable cam ring 27. A control valve 40 for controlling a swing of the cam ring is provided. To operate the control valve, a variable metering throttle 61 is provided in the middle of a discharge path. The variable metering throttle 61 is formed with a communicating channel 62 which is formed in the side surface of one side of the cam ring in the axial direction, and communicates with a discharge-side hollow 33 being formed in a pressure plate 30 which faces the side surface, and a small hole 63 which is bored in the pressure plate 30 while facing a part of the communicating channel, and of which the opening area is varied with the side edge 62a of the communicating channel of the cam ring 27 when the cam ring swings.

4 Claims, 8 Drawing Sheets

VARIABLE CAPACITY HYDRAULIC PUMP

BACKGROUND OF THE INVENTION

1. Field of the Invention

The present invention relates to a variable capacity hydraulic pump for a device utilizing pressure fluid, such as a power steering device, which reduces a steering power in a vehicle, for example.

2. Description of the Related Art

A capacity type vane pump directly driven by a vehicle engine has been used for a pump for use with a power steering device of this type. In the capacity pump of this type, quantity of a working fluid varies in dependence upon a engine speed. Therefore, an auxiliary steering power is increased when the vehicle stops or runs at low speed, and it is decreased when the vehicle runs at high speed. That is, the capacity pump is required to have a characteristic contradictory to a characteristic on an auxiliary steering power required for the power steering device. For this reason, it is necessary to use a capacity pump of a large capacity which is capable of producing such a quantity of the discharge fluid as to secure a necessary auxiliary steering power even when the vehicle runs at low speed. Additionally, it is essential to use a flow control valve which controls the quantity of the discharge fluid to be a predetermined value or smaller. As a result, the number of required component parts is relatively large, the structure and passage arrangement are complicated, and consequently it is unavoidable that the overall pump structure is increased in size and cost.

To solve the problems, there is proposed a variable capacity vane pump capable of decreasing the quantity of the discharge quantity per revolution (cc/rev) of the pump in proportion to the number of revolutions, as disclosed in JP-A-6-200883, 7-24338 and 8-200239. In each of those pumps, there is eliminated the use of the control flow valve attached to the capacity pump. As a result, the drive horsepower is reduced. In this respect, the proposed pump is excellent also in energy efficiency.

Figure 7:
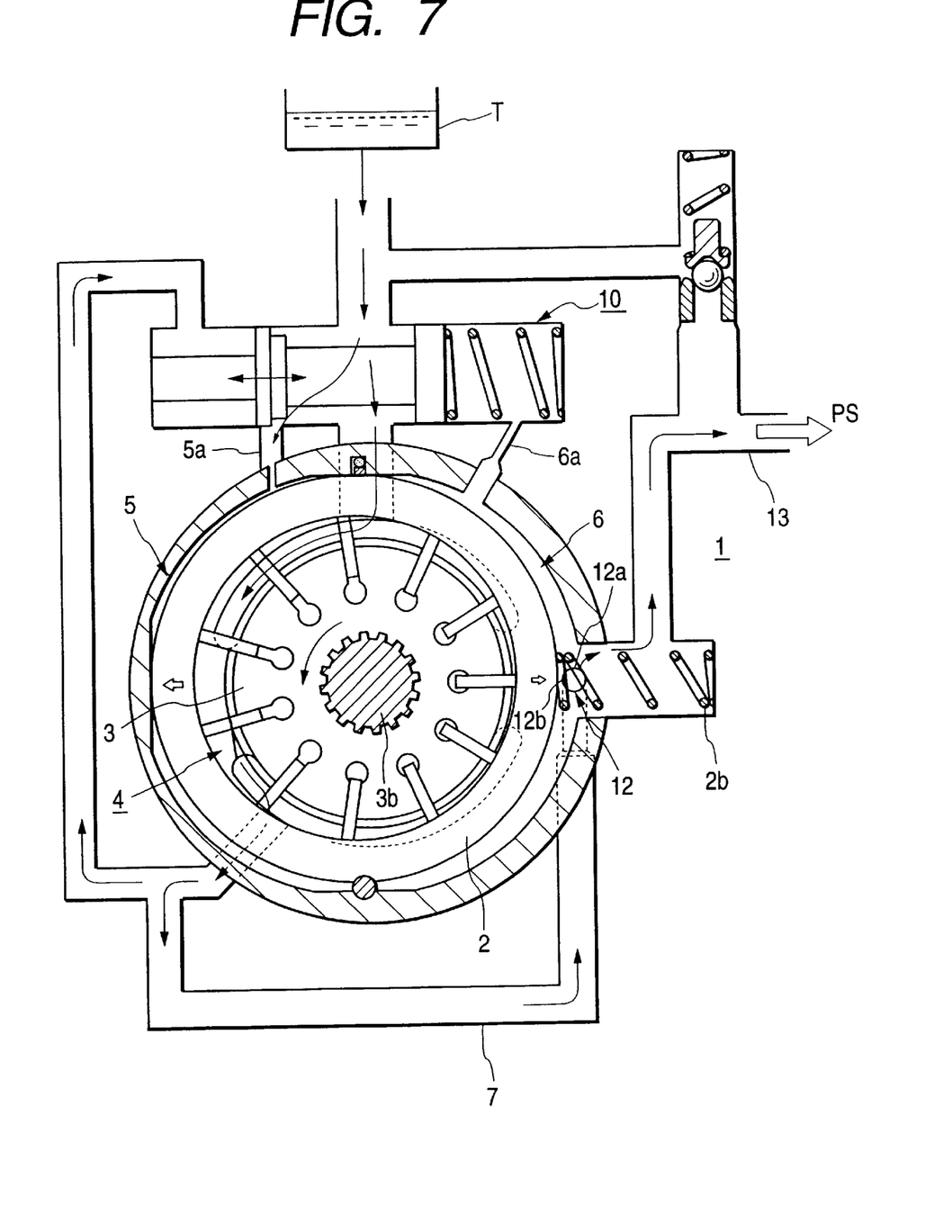
FIG. 7 is a diagram showing a conventional variable capacity hydraulic pump when it is operating at a low speed.

In the pump disclosed in JP-A-8-200239, for example, as shown in FIG. 7, a rotor 3 is disposed eccentrically relative to and within a cam ring 2, which is swingably supported within an elliptical space in a pump body 1, whereby a lunette pump chamber 4 is formed between the rotor 3 and the cam ring 2. First and second pressure chambers 5 and 6 are formed on both sides of the cam ring 2 as viewed in the swing direction. A compression spring 2b, which urges the cam ring in such a direction as to maximize the pump capacity of the lunette pump chamber 4, is provided in the second pressure chamber 6. A control valve 10 is provided which is operated by a fluid pressure difference between the upstream and downstream sides of a variable metering throttle 12 provided at the mid position of a discharge path 7 through which a pressure fluid discharged from the lunette pump chamber 4 flows. The cam ring 2 is swung through the control of the fluid pressures in the first and second pressure chambers 5 and 6 by the control valve 10.

A hole 12a is bored in the side wall of the pump body 1, which faces the inside of the second pressure chamber 6. An opening area of the hole 12a is adjusted with an outer peripheral edge 12b of the cam ring 2 when the cam ring 2 is swung, whereby the variable metering throttle 12 is formed. That is, the pump has a structure to directly introduce the fluid pressure of a downstream side of the variable metering throttle 12 into the second pressure chamber 6 of those chambers 5 and 6 for swinging the cam ring 2. The pressure fluid discharged from the lunette pump chamber 4 is introduced into the hole 12a defining the variable metering throttle 12. The pressure fluid flowing into the second pressure chamber 6 through the hole 12a is sent to a pump discharge path 13 via the second pressure chamber 6, and discharged through an outlet port, not shown.

The variable capacity hydraulic pump employs such a structure that when the pump operates in high speed region, a fluid pressure in the upstream side of the variable metering throttle 12 is introduced, by means of the control valve 10, into the first pressure chamber 5 through a passage 5a having a damper throttling function. In such a structure, when the cam ring 2 swings toward the first pressure chamber 5, a given braking force is caused to act on the cam ring 2 by the damping function of the passage 5a.

As described above, the compression spring 2b is merely provided for the second pressure chamber 6, and the second pressure chamber 6, unlike the first pressure chamber 5, is not provided with means having a damping function for applying a braking force to the cam ring 2. The reason for this is that the hole 12a of the variable metering throttle 12 is opened to the second pressure chamber 6, and are used also as parts of the discharge paths 7 and 13. The fluid pressure in the discharge side of the second pressure chamber 6 propagates through those paths. In the figure, reference numeral 6a designates a passage for leading the fluid pressure in the downstream side of the variable metering throttle 12 to the other chamber of the control valve 10.

Accordingly, when the cam ring 2 swings toward the second pressure chamber 6, a resilient force that is generated by the compression spring 2b when it is flexed acts on the cam ring, but it is impossible to apply a damper basis braking force to it. Therefore, the swing of the cam ring 2 to the first and second pressure chambers 5 and 6 (particularly the swing of it from the first pressure chamber 5 to the second pressure chamber 6) is not smooth. If the swing of the cam ring is not smooth, it is unavoidable that the cam ring 2 vibrates, and a pulsation occurs in the fluid pressure in the pump discharge side. A pulsating variation of the fluid pressure is shown as a waveform indicated by a broken line in FIG. 8.

This will be described in more detail. The fluid pressure of the pump discharge side flows in a jet stream from the hole 12a that is opened to the second pressure chamber 6, into the second pressure chamber. When the opening of the hole 12a is opened or closed with the outer peripheral edge 12b of the cam ring, the cam ring 2 tends to vibrate. Further, when the jet stream of the pressure fluid flowing out from the hole 12a is inhibited or permitted to flow, the pulsation of the fluid pressure increases. When the vibration and pulsation occur in the fluid, the power steering device suffers from variation of the steering force, growing of noise, e.g., fluid sound, and the like.

SUMMARY OF THE INVENTION

An object of the present invention is to provide a variable capacity hydraulic pump which suppresses the vibration of the cam ring and the pulsation of the fluid pressure of the pump discharge side.

To achieve the object, the present invention provides a variable capacity hydraulic pump in which a cam ring forming a pump chamber is swingably supported within an inner space of a pump body, a first fluid pressure chamber is formed on one side of the cam ring as viewed in the swing direction, a second fluid pressure chamber is formed on the other side of the cam ring, urging means is provided for urging the cam ring in such a direction as to maximize a capacity of the pump chamber, a control valve is provided which operates in response to a fluid pressure difference between the upstream and downstream sides of a variable metering throttle provided in the middle of a discharge path through which pressure fluid discharged from the pump chamber flows, and a fluid pressure within at least the first fluid pressure chamber is controlled by the control valve to swing the cam ring. The variable capacity hydraulic pump is improved in that the variable metering throttle is provided at a position which is located between the side surface of one side of the cam ring as viewed in the axial direction and the side wall of the pump body which faces the side surface, and is structurally isolated from the second fluid pressure chamber.

In the thus constructed variable capacity hydraulic pump, the variable metering throttle is provided at a structurally isolated position which does not affect a fluid pressure within the second fluid pressure chamber. Therefore, the cam ring may be swung while be given damping functions by the fluid pressures in the first and second first fluid pressure chamber.

The invention also provides another variable capacity hydraulic pump which is constructed as described above, and additionally has the following construction: the variable metering throttle is formed with a communicating channel which is formed in the side surface of one side of the cam ring in the axial direction, and communicates with a discharge-side hollow being formed in the side wall of the pump body which faces the side surface, and a small hole which is bored in the side wall of the pump body at a position facing a part of the communicating channel, and of which the opening area is varied with the side edge of the communicating channel of the cam ring when the cam ring swings.

In the last-mentioned invention, a degree of throttling of the variable metering throttle may be adjusted in a manner that the small hole of the side wall of the pump body, which faces the communicating channel formed in the side surface of one side of the cam ring, is closed or opened with the side edge of the communicating channel of the cam ring when the cam ring swings.

DETAILED DESCRIPTION OF THE PRESENT INVENTION

FIGS. 1 through 4 are diagrams showing an embodiment of a variable capacity hydraulic pump according to the present invention. A pump to be employed for the embodiment of the invention is a vane type oil pump which serves as a hydraulic pressure source for a power steering device, and has the so-called drooping characteristic in which with increase of the pump speed, the quantity of the pressure fluid decreases to be below its maximum quantity and the decrease of the fluid quantity is maintained.

Figure 1:
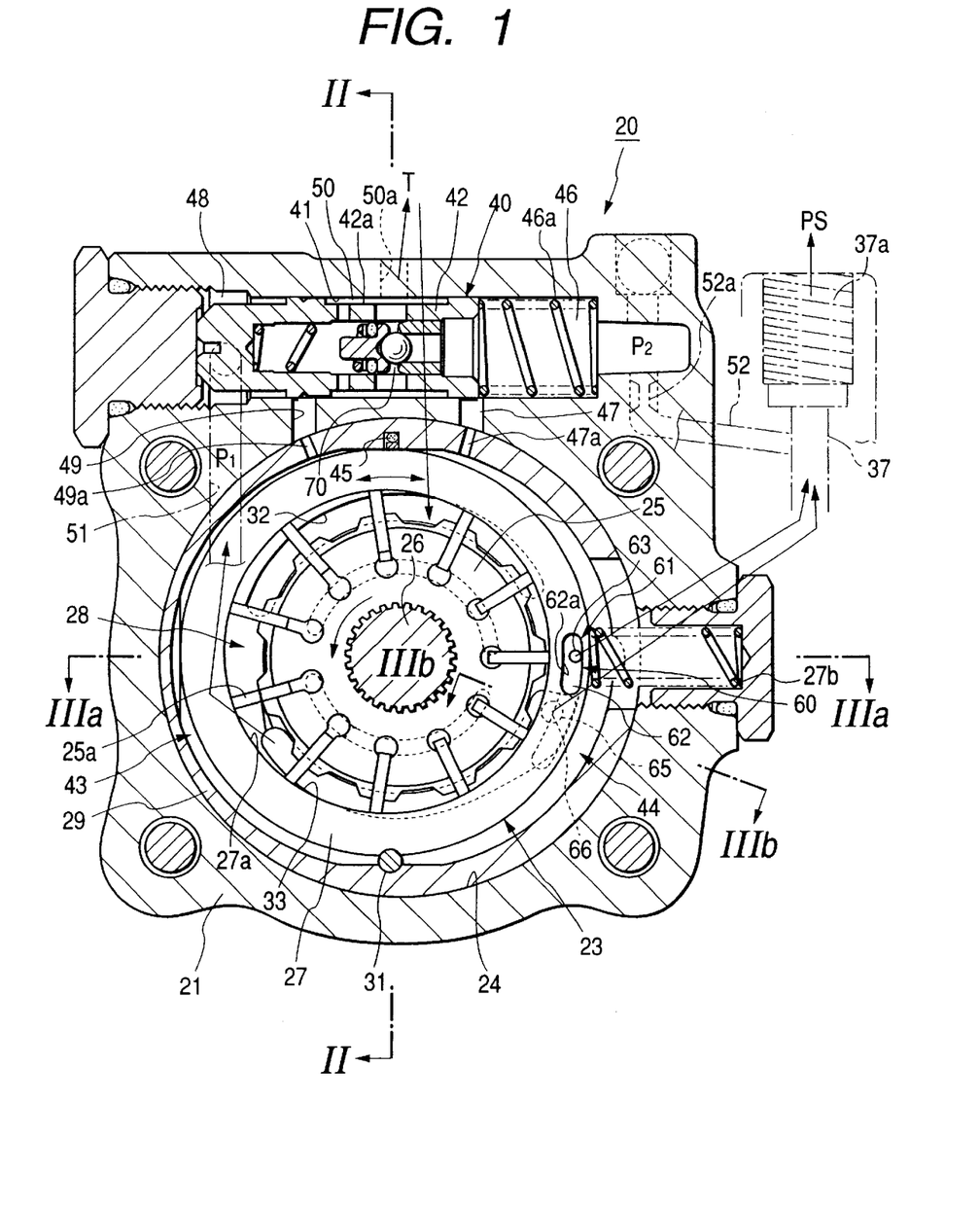
FIG. 1 shows an embodiment of a variable capacity vane pump according to the present invention and is a cross sectional view showing the pump when it is operating at low speed.
Figure 2:
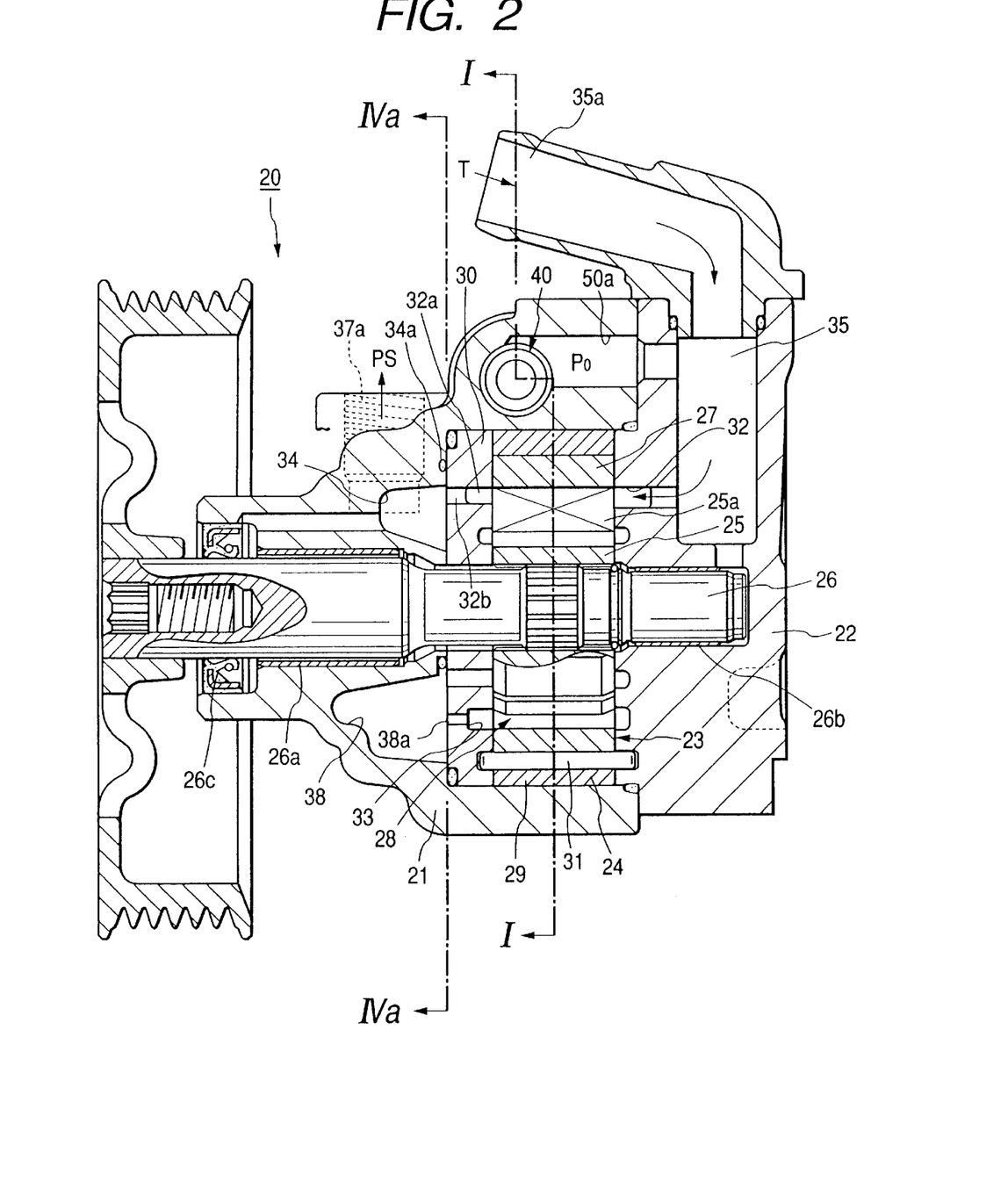
FIG. 2 is a cross sectional view taken on line II—II in FIG. 1.
Figures 3A, 3B:
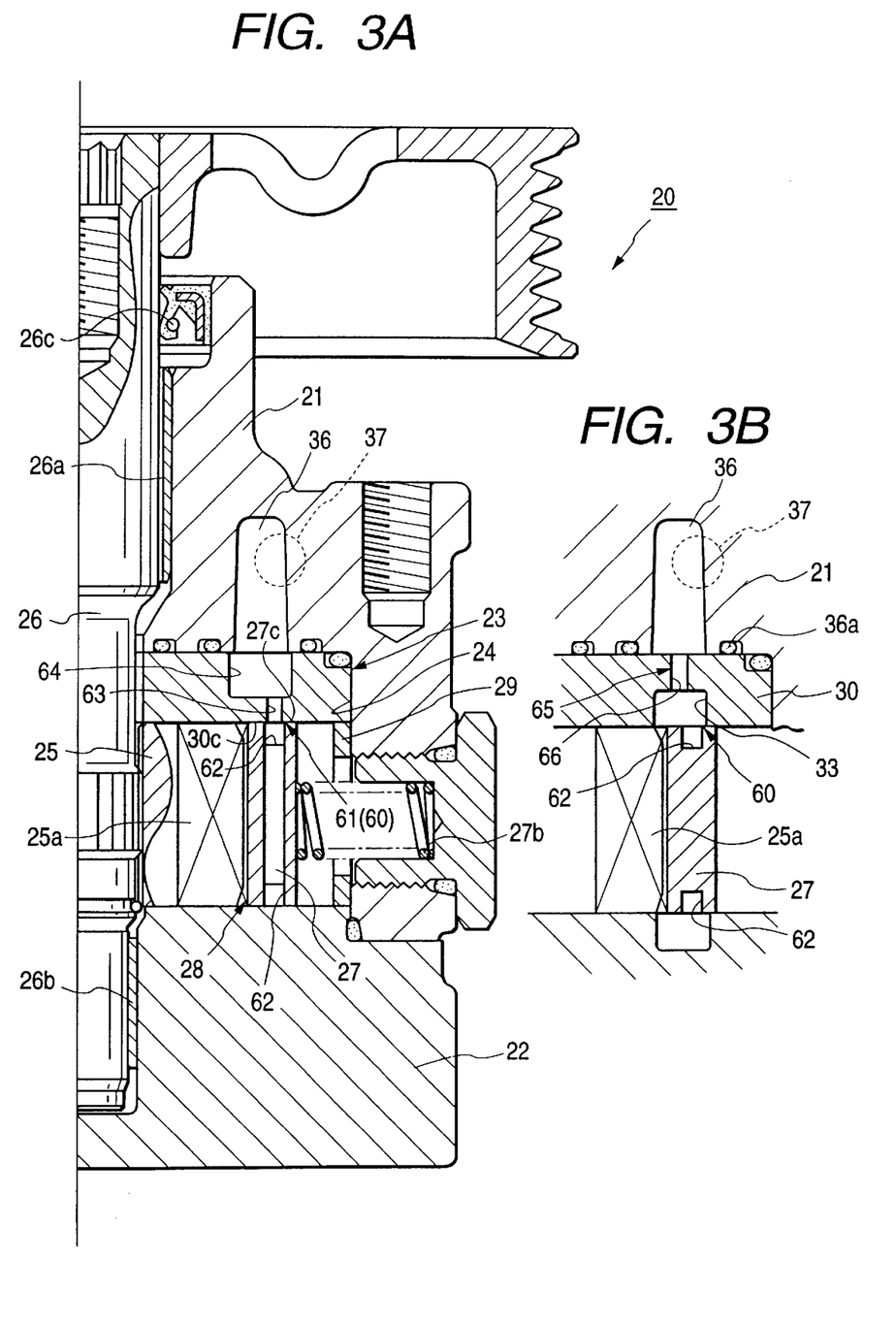
FIG. 3a is a cross sectional view taken on line IIIa—IIIa in FIG. 1.
FIG. 3B is a cross sectional view taken on line IIIb—IIIb in FIG. 1.

In FIGS. 1 through 3, a variable capacity vane pump generally designated by reference numeral 20 includes a front body 21 and a rear body 22, which form a pump body. The front body 21 is shaped like a cup as a whole. An accommodating space 24, which accommodates a pump constituting element 23 as a pump cartridge, is formed in the front body. The rear body 22 is combined with the front body in a state that the opened end of the accommodating space 24 is closed with the latter.

A drive shaft 26 for driving a rotor 25 constituting the pump constituting element 23 to rotate is rotatably supported on the front body 21 by means of bearings 26a and 26b (bearing 26a is located in the front body 21 and the bearing 26b is located in the rear body 22), while passing through the front body 21. Reference numeral 26c designates an oil seal 26c. The rotor 25 is rotated in a counterclockwise direction indicated by an arrow in FIG. 1.

Reference numeral 27 indicates a cam ring, and the cam ring 27 includes an inner cam face 27a fit to the outer circumferential surface of the rotor 25 with vanes 25a, and a pump chamber 28 is defined between the inner cam face 27a and the rotor 25. The cam ring 27 is eccentrically positioned relative to the rotor 25 in an eccentric state, and a lunette space formed between the cam ring 27 and the rotor 25 serves as the pump chamber 28. The cam ring 27 is swingably disposed within an adapter ring 29, which is located within the accommodating space 24 while interfitting with the inner wall portion of the accommodating space 24, so as to vary a capacity (pump capacity) of the pump chamber 28 as will be described later. Reference numeral 27b designates a compression spring for urging the cam ring 27 in such a direction as to maximize the pump capacity of the pump chamber 28.

In FIGS. 2 and 3, reference numeral is indicative of a pressure plate. The pressure plate 30 is pressingly layered on the side of the pump cartridge (pump constituting element 23) which is closer to the front body 21, the pump cartridge being formed with the rotor 25, cam ring 27 and adapter ring 29. The end face of the rear body 22 as a side plate is brought into press contact with the opposite side of the pump cartridge, whereby the front body 21 and the rear body 22 are coupled together into a one-piece construction. Those components make up the pump constituting element 23.

The pressure plate 30 and the rear body 22 as will serve as a side plate and being layered on the pressure plate 30 in a state that the cam ring 27 is interposed therebetween, are coupled into a unit body, while being positioned in the rotational direction by a support pin 31. The support pin 31 serves as a pivot pin about which the cam ring 27 is swung, and a positioning pin, and further as a seal member for defining he fluid pressure chamber for swinging the cam ring 27.

Reference numerals 32 and 33 designate respectively a suction-side intake hollow and a discharge-side hollow. Those hollows 32 and 33 are each formed like an arcuate groove. As shown in FIG. 1, those hollows are opened to a pump suction region at the start end as viewed in the rotational direction of the rotor 25 and a pump discharge region at the terminating end as viewed in the same direction. As shown in FIG. 2, the intake hollow 32 is defined by a recess formed in the end face of the rear body 22, which faces the pump chamber 28. The discharge hollow 33 is defined by a recess formed in the end face of the pressure plate 30, which is closer to the pump chamber 28.

Figure 4A:
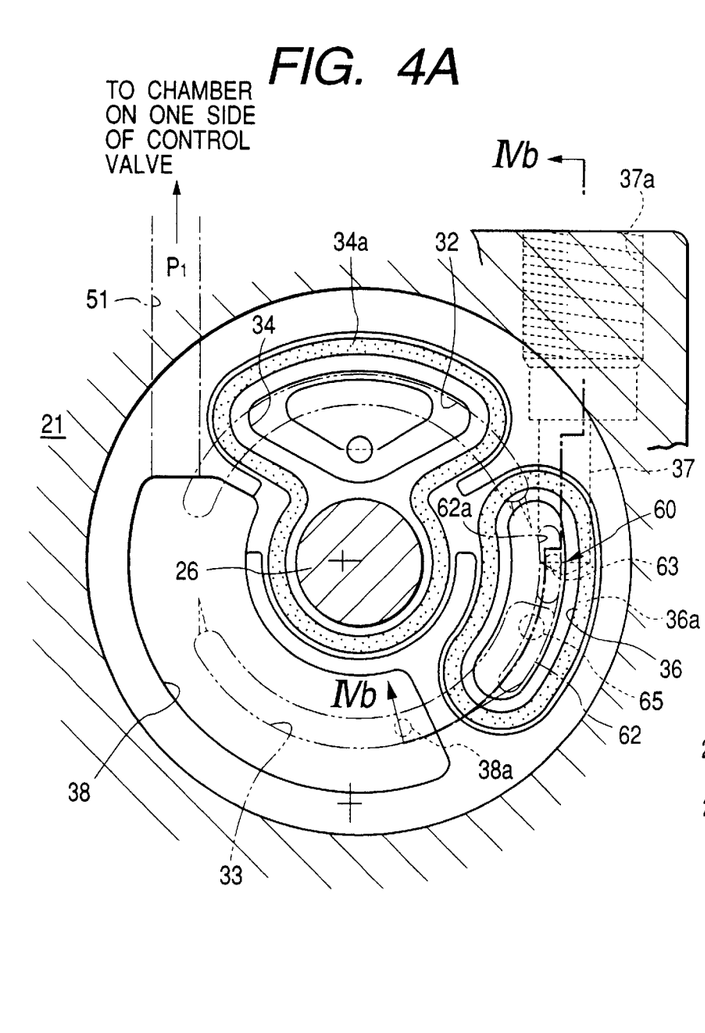
FIG. 4A is a cross sectional view taken line Iva—Iva in FIG.2.
Figure 4B:
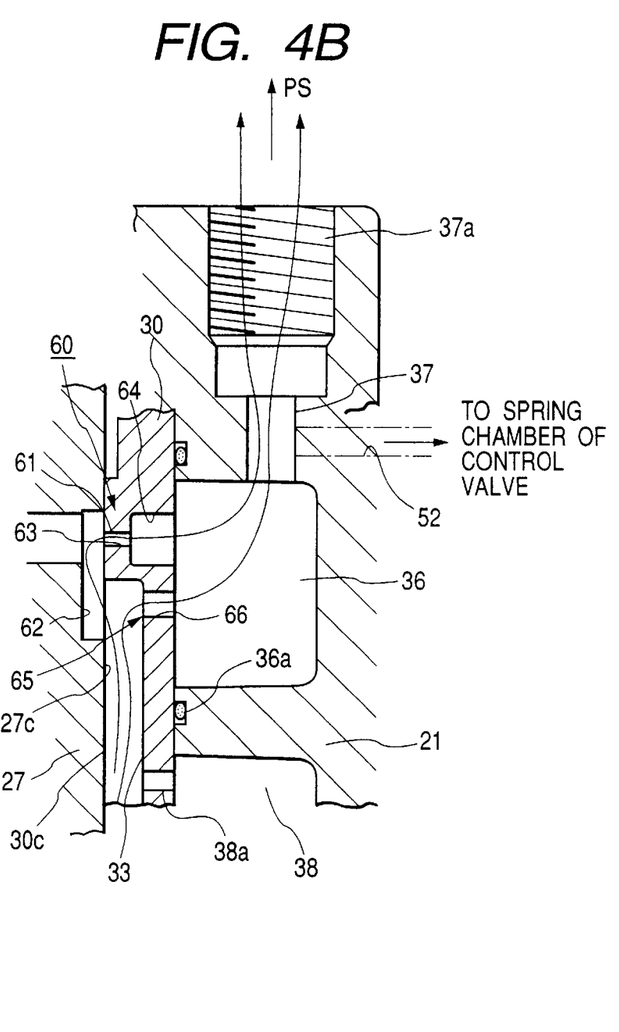
FIG. 4B is a cross sectional view taken on line Ivb—Ivb in FIG. 2.

A groove 32a and a hole 32b, which resemble in configuration, are formed in the pressure plate 30 at a position facing the intake hollow 32. The hole 32b, as shown in FIGS. 4A and 4B, is communicatively connected to a suction-side pressure chamber 34, shaped like a fan, formed in the bottom of the accommodating space 24 of the front body 21. Reference numeral 34a in FIG. 4A is an O-ring 34a surrounding the pressure chamber 34 and the drive shaft 26.

A suction path 35 is formed in the rear body 22. The suction path 35 feeds a fluid sucked from a tank T to the intake hollow 32 via a suction port 35a. The fluid sucked from the tank T (pump suction side) passes through the suction port 35a and the suction path 35 in the rear body 22, and fed into the pump chamber 28 through the intake hollow 32 opened to the end face of the intake hollow 32.

In the bottom of the accommodating space 24 of the front body 21, a discharge-side pressure chamber 36, substantially arcuately shaped, is formed at a position corresponding to the terminating end of the discharge hollow 33 of the pressure plate 30 as viewed in the rotational direction of the rotor. The pressure chamber 36 is communicatively connected to an outlet port 37a via a discharge path 37 formed in the front body 21, and a fluid pressure that is led to the pressure chamber 36 is discharged through the outlet port 37a. Reference numeral 36a in FIG. 4A indicates an O-ring for sealing the suction-side pressure chamber 36.

In the bottom of the accommodating space 24 of the front body 21, as shown in FIGS. 2 and 4A, a space 38 is formed at a location except the suction-side and discharge-side pressure chambers 34 and 36. The space 38 is a volumetric space having a given volume, which is formed by the utilization of a dead space of the front body 21. The space 38 communicates with the discharge-side hollow 33 via a small hole 38a bored in the pressure plate 30.

The space 38 is a dead-end space connected through a throttling passage by the small hole 38a when viewed from a discharge path system of the pump. The space functions as a resonating chamber of the reaction type which damps a variation of the fluid pressure in the discharge side of the pump, and reduces noise caused by the pressure variation.

Reference numeral 40 is a control valve 40 formed with a valve hole 41 and a spool 42, which are formed in the upper portion of the front body 21 while being oriented perpendicular to the drive shaft 26. The control valve 40 operates in response to a difference between the upstream and downstream fluid pressures present upstream and downstream of a metering throttle portion 60, which is provided in the middle of a pump discharge path to be described later. The control valve 40 controls the fluid pressures introduced into first and second fluid pressure chambers 43 and 44 in accordance with the number of revolutions of the pump. Within the adapter ring 29 those fluid pressure chambers are separated from each other by the support pin 31 and a seal member 45, which is located symmetrically with the former with respect to the axis.

A pilot pressure passage 51 (indicated by a phantom line in FIG. 1) is led out of the space 38 into which the fluid pressure derived from the pump discharge side is introduced, and coupled to one end of the valve hole 41, thereby forming a chamber 48 into which a fluid pressure P1 is introduced from the upstream side of the metering throttle portion 60. A coil spring chamber 46 having a compression spring 46a, which urges the spool 42 against the one end of the valve hole 41, is provided at the other end of the valve hole 41. The compression spring 46a urges the spool 42 to the left in FIG. 1.

A pilot pressure passage 52, which is extended from a position close to the outlet port 37a as the terminal end of the discharge path 37 in the front body 21, is connected to the coil spring chamber 46, whereby a fluid pressure P2 present downstream of the metering throttle portion 60 is led thereby. A pump, suction-side chamber 50, which includes a passage 50a connected to the pump suction side (tank T), and is formed with an annular groove 42a located at the central portion of the spool 42, is formed in the middle of the valve hole 41 as viewed in the axial direction.

If required, a pilot throttle 52a as indicated by a one-dot chain line in FIG. 1 may be provided in the middle of the pilot pressure passage 52. Provision of he pilot throttle 52a eliminates adverse influence of the control valve 40 upon the spool 42, such as fluid pressure variation.

Further, the pilot throttle 52a drops a fluid pressure in the coil spring chamber 46 of the control valve 40 when a relief valve 70 provided in the spool 42 is operated. Under control of the control valve 40 that is operated in response to the pressure drop, the cam ring 27 swings in such a direction as to reduce a capacity of the pump chamber 28. As a result, the quantity of the pressure fluid reduces. This fact is advantageous in energy saving of the pump.

When the spool 42 is positioned as shown in FIG. 1, the coil spring chamber 46 is connected to the second fluid pressure chamber 44 by a connection passage 47. When the spool 42 is moved toward the coil spring chamber 46 (to the right in the figure), the coil spring chamber 46 is gradually detached from the second fluid pressure chamber 44. Therefore, the fluid pressure P2 downstream of the metering throttle portion 60 and the fluid pressure of the pump suction side are applied to the second fluid pressure chamber 44 via the coil spring chamber 46 and the suction-side chamber 50, by the action of the spool 42. A damper throttle 47a is formed at a part of the connection passage 47.

The high pressure side chamber 48 formed at the one end of the spool 42 is closed when the spool 42 is at the FIG. 1 position, and it is selectively connected to the first fluid pressure chamber 43 through a connection passage 49 which is gradually detached from the suction-side chamber 50 when the spool 42 moves toward the coil spring chamber 46 (to the right in the figure). Accordingly, the fluid pressure of the pump suction side and the fluid pressure P1 upstream of the metering throttle portion 60 are applied to the first fluid pressure chamber 43 through the suction-side chamber 50 and the high pressure side chamber 48, by the action of the spool 42. A damper throttle 49a is formed at a part of the connection passage 49.

In FIG. 1, the connection passage 49 is connected to the suction-side chamber 50 formed at the central portion of the spool 42 as viewed in the axial direction by way of a gap passage defined by a chamfer portion formed on a land portion at one end of the spool 42. The fluid pressure P1 of the pilot pressure passage 51 (fluid pressure of the upstream side of the metering throttle portion 60) is selectively connected to the first fluid pressure chamber 43 via the connection passage 49, depending on a displacement of the spool 42.

When the pump starts to operate and is in low speed operation, the pressure difference between the upstream and down stream sides of the metering throttle portion 60. Accordingly, the spool 42 is at the FIG. 1 position, the first fluid pressure chamber 43 is connected to the pump suction side and a fluid pressure P0 is led thereinto. On the other hand, the discharge-side fluid pressure P2 present downstream of the metering throttle portion 60 is introduced into the second fluid pressure chamber 44, and the cam ring 27 maintains its state to maximize the capacity of the pump chamber 28.

When the number of revolutions of the pump is in medium and high speed operation, the spool 42 moves in such a direction as to deflect the compression spring 46a, so that the chamber 48 to which the pilot pressure passage 51 is connected is connected to the connection passage 49. When this state is set up, the fluid pressure P1 upstream of the metering throttle portion 60 and the fluid pressure P0 of the suction-side chamber 50 are introduced into the first fluid pressure chamber 43 depending on the quantity of movement of the spool 42.

The supply of the fluid pressure P2 downstream of the metering throttle portion 60 to the connection passage 47 is blocked with the land portion, and the second fluid pressure chamber 44 is connected to the suction-side chamber 50 by way of a gap passage defined by the chamfer portion. As a result, the second fluid pressure chamber 44 is at the fluid pressure P0 of the pump suction side, and the cam ring 27 displaces in a swing fashion to the right in FIG. 1 as described above to reduce the capacity of the pump chamber 28.

The construction other than the above-mentioned one of the thus constructed variable capacity vane pump 20 is known, and hence description of the details of it is omitted.

In the embodiment, the metering throttle portion 60 for operating the control valve 40 for controlling the swing of the cam ring 27 is designed to have a drooping characteristic in which when the pump speed enters the medium or high speed region, the quantity of fluid discharged from the variable capacity vane pump 20 is set at a predetermined quantity of fluid smaller than a maximum quantity of discharging fluid, and the predetermined quantity of fluid is maintained. A variable metering throttle 61 required for this, as shown in FIGS. 1, 3 and 4A and 4B, is provided at a position which is located between a side surface 27c of one side of the cam ring 27 in the axial direction and the pressure plate 30 being confronted with the former, and structurally isolated from the second fluid pressure chamber 44.

To be more specific, a substantially arcuate communicating channel 62, which communicates with the discharge-side hollow 33 being formed in the inner wall 30c of the pressure plate 30 closer to the pump chamber 28 while facing the discharge side region of the pump chamber 28, is formed in the side surface 27c of one side of the cam ring 27 in the axial direction. A small hole 63 is bored in the inner wall 30c of the pressure plate 30 closer to the pump chamber 28 at a position where it faces a part of the communicating channel 62. This small hole 63 is connected to the pressure chamber 36 of the pump discharge side through a passage hole 64 formed in the pressure plate 30. The opening area of the small hole 63 may be varied with the side edge 62a of the communicating channel 62 of the cam ring 27, whereby the variable metering throttle 61 is formed. A part of the communicating channel 62 passes through the cam ring 27 as shown in FIGS. 1, 3A, 4A and 4B, thereby balancing the pressures on both sides thereof or securing a passage area of the fluid pressure passage.

In such a structure, when the cam ring 27 swings in such a direction as to reduce the capacity of the pump chamber 28, the opening area of the small hole 63 shown in FIG. 1 reduces from its area when it is opened to the communicating channel 62 since it is gradually closed with the side edge 62a of the communicating channel 62. When the cam ring 27 is fully swung to the left in the drawing, the small hole 63 is completely closed an the variable metering throttle 61 is closed.

In the embodiment, in FIGS. 1, 4A and 4B, a hole 66 is formed in the terminal end of the discharge-side hollow 33 as viewed in the rotational direction, whereby the discharge-side hollow 33 is communicatively connected to the pressure chamber 36 of the discharge side. This hole 66 serves as a fixed metering throttle 65 forming the metering throttle portion 60, thereby causing a fluid pressure difference for operating the control valve 40.

Accordingly, when the variable metering throttle 61 is closed, the control valve 40 is controlled by the pressure difference between the upstream and downstream sides of the fixed metering throttle 65, so that the quantity of the discharged fluid is substantially constant. In the embodiment, the hole 66, which will serve as the fixed metering throttle 65, is provided between the discharge-side hollow 33 and the pressure chamber 36. If required, the hole 66 may be formed at any position if it lies in the middle of the discharge path of the pump. What is essential is to lead the fluid pressures at the upstream and downstream sides of the hole 66 to the chambers 48 and 46.

The variable capacity hydraulic pump of the invention is different from the conventional one, in the structure forming the variable metering throttle 61. As described, the variable metering throttle is structurally isolated from the second fluid pressure chamber 44. A jet stream of the pressure fluid flowing through the variable metering throttle 61 does not affect the fluid pressure within the second fluid pressure chamber 44. Therefore, the swing operation of the cam ring 27 is stably performed.

In this case, the damper throttle 47a provided in the connection passage 47 which communicates the second fluid pressure chamber 44 with the pump discharge side, like the damper throttle 49a provided in the connection passage 49 of the first fluid pressure chamber 43, functions to suppress a variation of the fluid pressure within the chamber and as a result, an unnecessary motion of the cam ring 27.

Specifically, the first and second fluid pressure chambers 43 and 44 for swinging the cam ring 27 are connected through the damper throttles 49a and 47a to the control valve 40, and to the upstream and downstream sides of the metering throttle portion 60 located in the middle of the pump discharge path. Therefore, when the cam ring 27 is swung by the fluid pressure difference between the upstream and downstream sides of each of the variable metering throttles 61 and 65, a necessary braking force is applied to the cam ring 27 in both directions of the swing. Thus, the appropriate braking force is applied to the cam ring when it is swung to the first and second fluid pressure chambers 43 and 44. Therefore, the cam ring 27 may smoothly be swung while being free from the vibration of the cam ring 27 and the pulsation of the fluid pressure in the pump discharge side.

Figure 8:
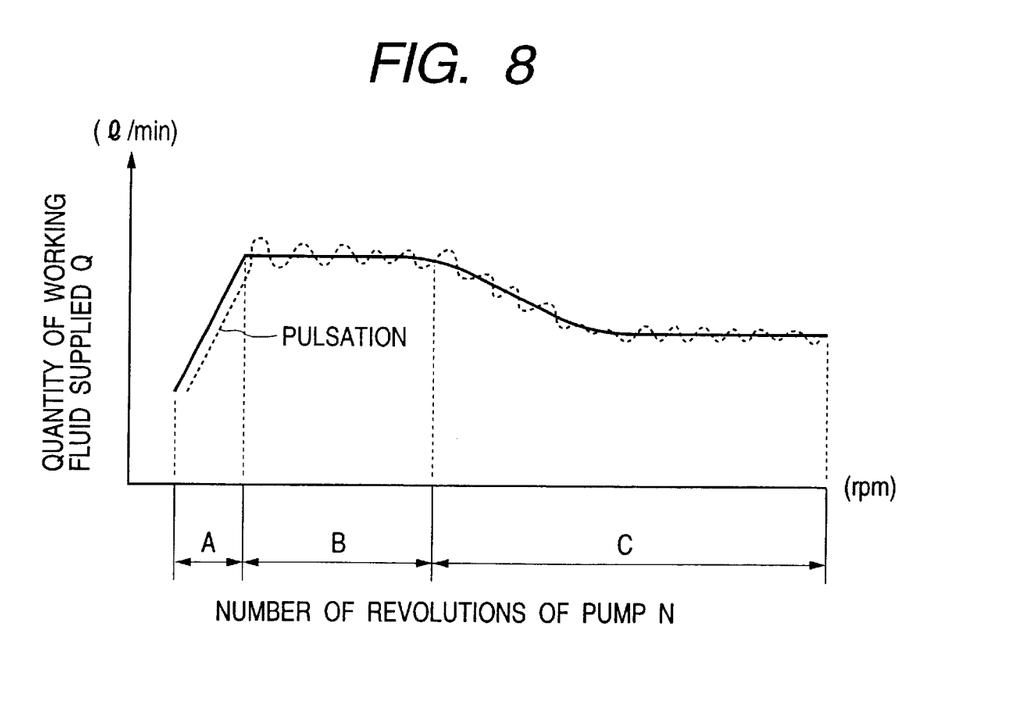
FIG. 8 is a characteristic diagram showing a variation of the quantity Q of supplied fluid with respect to the a relation of the number of revolutions N in the variable capacity vane pump.

Thus, the cam ring 27 is swung in a given state in accordance with a magnitude of the flow rate of the fluid in the pump discharge side by use of the first and second fluid pressure chambers 43 and 44, which are given the damper function, and as indicated by a solid line in FIG. 8, the quantity of the fluid supplied to the pump discharge side is maintained at a fixed value or with increase of the pump speed it is maintained at a value smaller than the fixed value. The fixed value of the fluid quantity is determined by the hole 66 forming the fixed metering throttle 65, and a value larger than the fixed value is determined by the opening area of the small hole 63 forming the variable metering throttle 61.

It should be understood that the present invention is not limited to the construction mentioned above, but the configurations of the component parts and related structures in the variable capacity vane pump 20 may variously be modified, altered and changed within the true spirits of the invention. In the embodiment mentioned above, one small hole 63 is used for the hole partially forming the variable metering throttle 61. If required, a plurality (three) of small holes 63 may be used instead as shown in FIG. 5, and FIGS. 6A through 6C. Where the plurality of small holes 63 are used, and the opening areas of the small holes 63 are varied with the side edge 62a of the communicating channel 62, a quantity of the opening area variation caused by the swing displacement of the cam ring 27 may be set at a large value larger when comparing with the case using one small hole.

Figure 5:
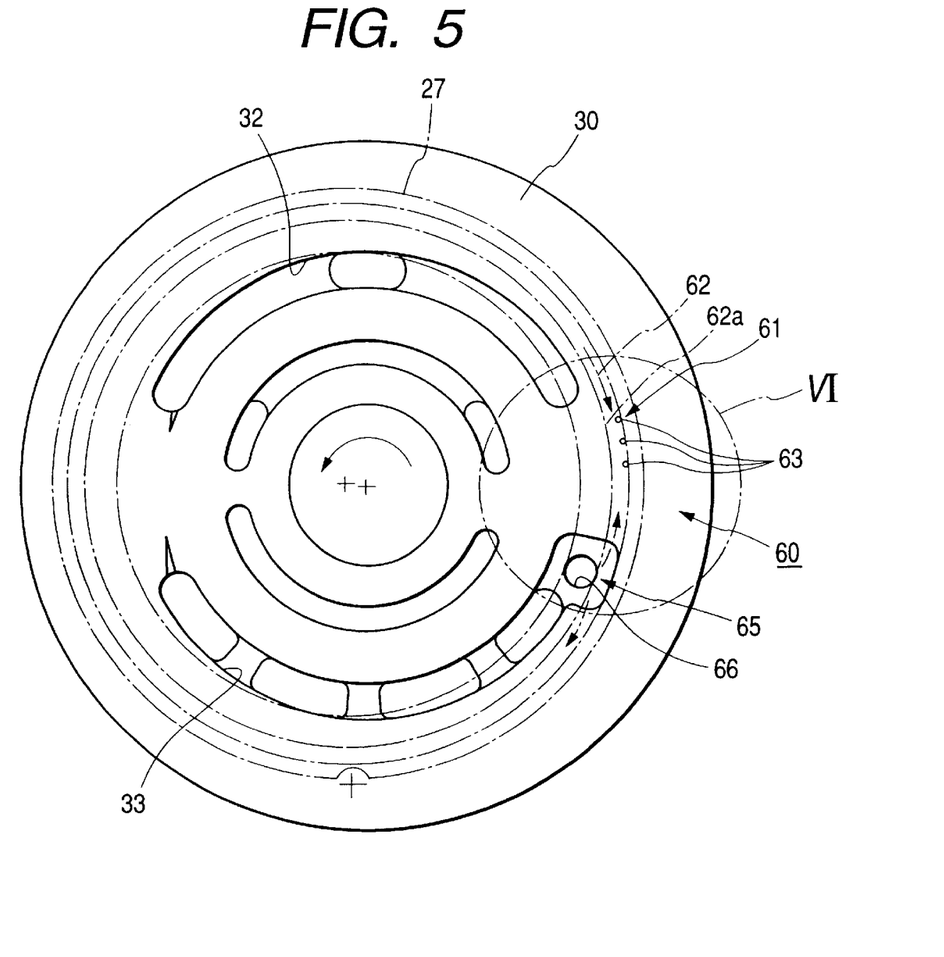
FIG. 5 is a side view showing a surface of a pressure plate facing a pump chamber in another embodiment of a variable capacity hydraulic pump according to the present invention.
Figure 6A:
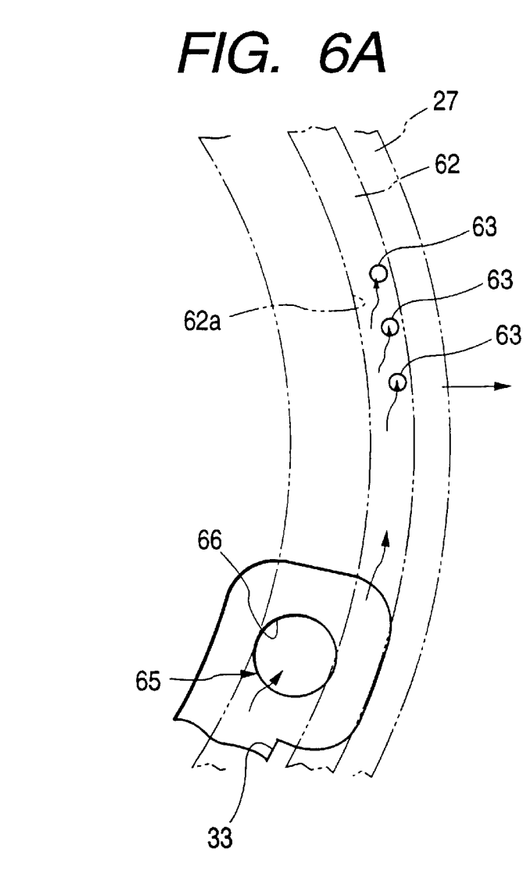
FIGS. 6A to 6C are enlarged views of a portion VI in FIG. 5 for explaining how the openings of small holes forming a variable metering throttle vary with a swing of the cam ring.
Figure 6B:
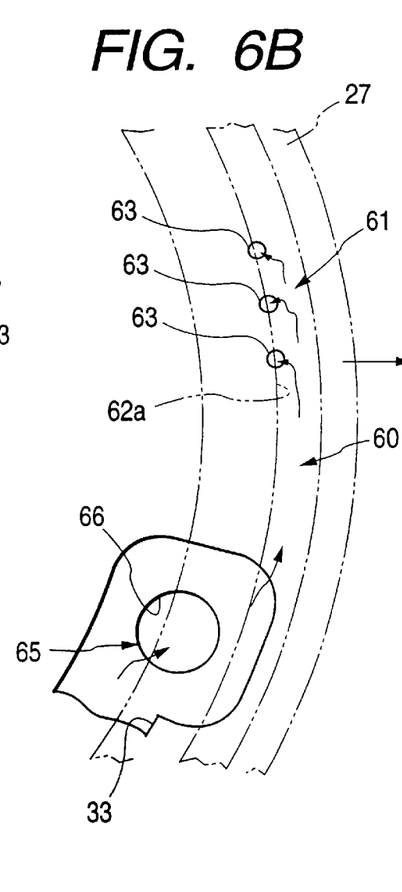
Figure 6C:
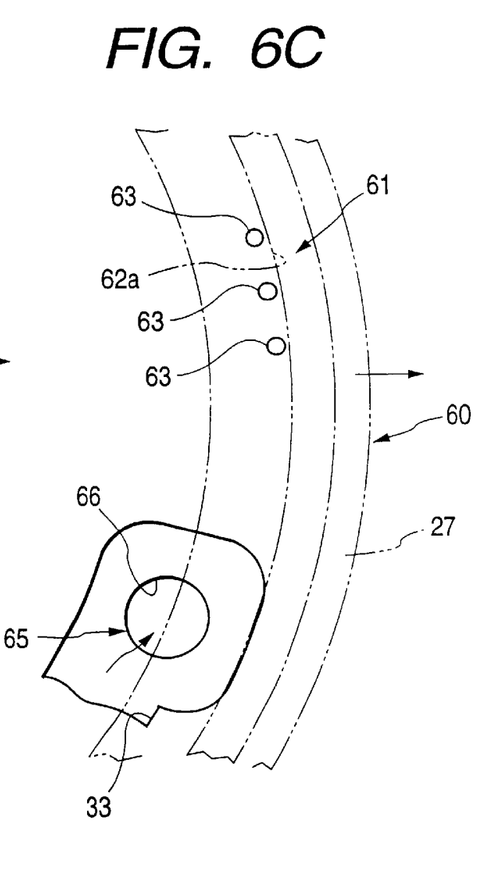

In the instance of FIG. 5, the communicating channel 62 of the cam ring 27 is an annular groove formed along the entire circumference of the side surface 27c of the cam ring 27, whereas in the embodiment mentioned above, it is arcuate groove. The annular groove is easy in its working. The hole of the variable metering throttle 61 is not limited to the hole circular in cross section, but it may take an appropriate cross-section shape.

In the embodiment mentioned above, the small hole 63 of the variable metering throttle 61 is formed in the inner wall of the pressure plate 30, which faces the side surface of the cam ring 27. In a case where the inner wall of the pump body is confronted with the cam ring 27, the small hole may be formed in the inner wall, not using the pressure plate. The small hole 63 partially forming the variable metering throttle 61 and the side edge 62a of the communicating channel 62 may be reversed in location: the small hole 63 is located at the position of the side edge 62a in the above-mentioned case, while the side edge 62a is located at the position of the small hole 63.

In the embodiment mentioned above, the metering throttle portion 60 is constructed such that the variable metering throttle 61 is separated from the fixed metering throttle 65, and the opening area of the variable metering throttle 61 is varied from the full open state to the full close state. In an alteration, one or a plurality of small holes are used for the metering throttle. Some of those small holes are put in full open state and are functioned as a fixed throttle, while the opening areas of the remaining small holes are varied and functioned as a variable throttle. In the description of the embodiment, the fixed metering throttle 65 and the variable metering throttle 61, which form the metering throttle portion 60, are referred merely to as "throttle". The reason for this is that those throttle portions may be orifices or chokes.

In the embodiment, the variable capacity vane pump 20 is described by way of example. The construction of the pump except the metering throttle portion 60 which is essential to the invention may be modified and altered appropriately. For example, the structures and the like of the suction path 35 and the discharge path 37 of the pump bodies 21 and 22 may appropriately be altered. The control valve 40 may take any structure if it is capable of securing the pressure difference between the first and second fluid pressure chambers 43 and 44 to swing the cam ring 27.

As seen from the foregoing description, the variable metering throttle for operating the control valve is structurally isolated from the second fluid pressure chamber such that it does not affect the fluid pressure within the second fluid pressure chamber. Therefore, the cam ring may be swung in a state that the second fluid pressure chamber is given the damper function. Accordingly, the cam ring may be swung while the fluid pressure chambers on both sides of the cam ring as viewed in its swing direction exhibit the damping functions. As a consequence, the pump of the invention succeeds in suppressing the vibration of the cam ring and the pulsation of the fluid in the pump discharge side, and improving the supplying fluid quantity vs. pump speed characteristic.

What is claimed is:

1. A variable capacity hydraulic pump comprising:

a pump body;

a cam ring supported within an inner space of the pump body to swing in a swinging direction, the cam ring defining: a pump chamber; a first fluid pressure chamber on one side of the swing direction of the cam ring; and a second fluid pressure chamber on the other side of the swinging direction of the cam ring;

urging member provided for urging the cam ring to a direction to maximize a capacity of the pump chamber;

a discharge path connected to the pump chamber, the discharge path through which a fluid discharged from the pump chamber flows;

a variable metering throttle provided in the middle of the discharge path; and a control valve operating in response to a fluid pressure difference between an upstream and downstream sides of the variable metering throttle, wherein a fluid pressure within at least the first fluid pressure chamber is controlled by the control valve to swing the cam ring; and the variable metering throttle is provided at a position between the side surface of one side of the cam ring in an axial direction of the cam ring and the side wall of the pump body facing the side surface; and the variable metering throttle is structurally isolated from the second fluid pressure chamber.

2. The variable capacity hydraulic pump according to claim 1, wherein the variable metering throttle defines:

a discharge-side hollow formed in the side wall of the pump body facing the side surface;

a communicating channel in the side surface of one side of the cam ring in the axial direction, the communicating channel communicating with the discharge-side hollow; and a small hole bored in the side wall of the pump body at a position facing a part of the communicating channel, the small hole having an opening area varying with the side edge of the communicating channel of the cam ring upon swinging the cam ring.

3. The variable capacity hydraulic pump according to claim 1, further comprising a rotor eccentrically positioned to the cam ring, wherein the pump chamber is defined between the rotor and the cam ring.

4. The variable capacity hydraulic pump according to claim 3, further comprising a plurality of vanes each connecting the rotor with the cam ring.

* * * * *